United States Patent [19]

Ryles et al.

[11] Patent Number: 4,825,949

[45] Date of Patent: May 2, 1989

[54] HIGH TEMPERATURE PROFILE MODIFICATION AGENTS AND METHODS FOR USING SAME

[75] Inventors: Roderick G. Ryles, Milford; Albert G. Robustelli, Darien, both of Conn.; James V. Cicchiello, Ryebrook, N.Y.

[73] Assignee: American Cyanamid Company, Stamford, Conn.

[21] Appl. No.: 160,941

[22] Filed: Feb. 26, 1988

Related U.S. Application Data

[62] Division of Ser. No. 729,512, May 2, 1985, Pat. No. 4,746,687.

[51] Int. Cl.$^4$ ............... E21B 33/138; E21B 43/22
[52] U.S. Cl. .................. 166/294; 166/274; 166/295; 523/130
[58] Field of Search ............ 252/8.551, 8.554, 8.51; 524/547; 525/328.2, 370, 371, 372; 523/130; 166/295, 294, 274

[56] References Cited

U.S. PATENT DOCUMENTS

| 2,718,497 | 9/1955 | Oldham et al. | 252/8.51 X |
|---|---|---|---|
| 3,502,149 | 3/1970 | Pence | 252/8.551 |
| 3,692,673 | 9/1972 | Hoke | 526/287 X |
| 3,749,172 | 7/1973 | Hessert et al. | 166/295 X |
| 3,762,476 | 10/1973 | Gall | 166/294 |
| 3,785,437 | 1/1974 | Clampitt et al. | 166/294 X |
| 3,795,276 | 3/1974 | Eilers et al. | 166/294 X |
| 4,055,502 | 10/1977 | Swanson | 166/307 X |
| 4,498,539 | 2/1985 | Bruning | 166/273 |
| 4,573,533 | 3/1986 | Ryles et al. | 166/275 |
| 4,655,943 | 4/1987 | Elmquist et al. | 252/8.551 |

Primary Examiner—Herbert B. Guynn
Attorney, Agent, or Firm—Frank M. Van Riet

[57] ABSTRACT

A new and improved composition and method for profile modification of subterranean formations characterized by high reservoir temperatures and/or harsh brine conditions are disclosed. The new and improved profile modification agents comprise a gelable composition comprising:

(a) water;

(b) a water-thickening and crosslinkable amount of a water-dispersible copolymer comprising from about 30 to about 99 mol % of units derived from at least one N-sulfohydrocarbon substituted acrylamide monomer copolymerized with from about 1 to about 70 mol % of units derived from at least one other monomer bearing a carboxyl group or a carboxyl precursor group; and (c) an amount of a polyvalent metal sufficient to crosslink the copolymer to form a stable gel. The profile modification agents are effective to alter the permeability of preselected portions of an underground formation by forming strong gels which are stable in harsh brine at temperatures of up to about 120° C. The composition and method are particularly adapted for use in enhanced oil recovery operations.

7 Claims, No Drawings

HIGH TEMPERATURE PROFILE MODIFICATION AGENTS AND METHODS FOR USING SAME

This is a division of application Ser. No. 729,512, filed May 2, 1985, now U.S. Pat. No. 4,746,687.

BACKGROUND OF THE INVENTION

The present invention relates to profile modification agents for altering the permeability of preselected portions of a subterranean formation. In preferred embodiments, the present invention relates to a new and improved composition and method for profile modification of a subterranean hydrocarbon-containing formation to reduce water:oil ratios and improve petroleum recovery during enhanced oil recovery operations. More particularly, it relates to new and improved aqueous gelable compositions exhibiting high temperature gel stability at temperatures up to about 150° C. and in harsh brines and methods for using same.

The enhanced secondary recovery of oil from oil-bearing or containing subterranean formations by fluid drive processes, wherein a fluid is injected into the formation by one or more injection wells to drive the oil through the formation to one or more production wells is a known process, commonly referred to as enhanced oil recovery. Fluids used in such processes include liquids such as water and various hydrocarbons, and gases such as hydrocarbon gases, carbon dioxide, steam, etc. Many oil reservoirs comprise layers or zones of porous rock which can vary in permeability from zone to zone. in all fluid drive processes, a recognized problem is the predilection of the drive fluid to channel along or through the more permeable zones of the formation. This is commonly referred to as channeling. Another problem is viscous fingering which occurs, for example, by the over-ride of a viscous fluid by a less viscous fluid. The more conductive zones after the oil has been largely displaced therefrom function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility i.e. the quotient of the reservoir's permeability to the drive fluid divided the viscosity of the drive fluid becomes large relative to the mobility of the reservoir oil.

One of the significant problems, therefore, attendant to the production of oil and gas from subterranean hydrocarbon containing formations, in the concomitant production of water. Such produced water can be reservoir water occassioned by coning or a similar phenomena of the aquifier, or it can be injection water from secondary or tertiary recovery treatments being applied to the formation. Whatever the source, there is an upper limit beyond which water production can no longer be tolerated and its further entry into the producing well bore must at least be reduced if further production of hydrocarbon resources at that location is to be continued.

Regardless of whether the undesired water is a natural drive fluid or an artificial drive fluid such as from secondary or tertiary recovery projects, the problem is primarily occassioned by the predilection of the drive fluid to preferentially seek the higher permeability zones and to more or less bypass the lower permeability zones. The mobility of a fluid in a permeable geological formation is the effective permeability of the formation to that fluid divided by the viscosity of the fluid. In the past, a conventional method for reducing the mobility of drive fluids through permeable formations has been to increase the drive fluids viscosity. Such an increase in viscosity is generally accomplished by using viscous solutions of high molecular weight polymers such as polyacrylamides, cellulose ethers, polysaccharides and the like. Such polymeric solutions have been found effective for reducing the water:oil ratio in the total producing well affluent and for increasing the daily production of hydrocarbonaceous fluids.

In actual field practice, however, such mobility altering polymers elute out of producing wells quickly and the water:oil ratios rapidly rise back to an undesirable level necessitating retreatment of the producing interval with the viscous polymer solutions. These viscosity increasing polymers are relatively expensive materials and a one time treatment would be particularly desirable.

More recently, reduction in the permeability of the pre-selected portions of various subterranean oil bearing formations has been accomplished with gelable solutions of polymeric materials. The formation of gels by the crosslinking of polymers is well known in the art for this purpose. A great deal of literature has been generated concerning the formation of gels in situ in underground formations for the purpose of treating the formations to better produce oil and gas from bore holes drilled into the formations and to decrease undesired water output. It is well recognized that polymer gels and processes incorporating same facilitate the plugging of underground formations in desired areas e.g. by modifying the fluid flow profile, and in particular by decreasing the relative permeability of the most permeable portions of the formations.

Prior art gelling compositions for use in profile modification applications generally comprise water, polymers capable of being cross-linked by polyvalent metal cations and polyvalent metal ion crosslinker. Prior art crosslinkable polymers have included polyacrylamides, carboxymethylcelluloses and polysaccharides, generally of high molecular weight in excess of one million. A commonly used system for generating polyvalent metal ions has been to provide them in the form of chelated metal ions complexes or as part of a redox system. The redox system will generally comprise redox couples wherein oxidizing agent is selected from water soluble compounds of polyvalent metals wherein the metal is present in a valence state which is capable of being reduced to a lower polyvalent state as exemplified by potassium permanganate, sodium permanganate, ammonium chromate, ammonium dichromate, the alkali metal chromates, the alkali metal dichromates and chromium trioxide. Sodium dichromate and potassium dichromate becaues of low cost and ready availability are the most widely used of the oxidizing agents. The reducing agents in the redox couples have included sulfur containing compounds such as sodium or potassium sulfide, sodium or potassium hydrosulfide, sodium or potassium metabisulfite, sodium or potassium bisulfite, hydrogen sulfide, sodium or potassium thiosulfate, thioacetamide and others, as well as non-sulfur containing compounds, such as hydroquinone, perahydrazinobenzoic acid, hydrazine phosphite, hydrazine dichloride and others. Illustrative prior art profile modification compositions and methods are disclosed in U.S. Pat.

Nos. 3,727,687; 3,952,806; 3,964,923; 3,981,363; 4,018,286; 4,039,029; 4,040,484; 4,043,921; 4,110,230; and 4,120,361 to list but a few.

The crosslinkable polymers used in the past have comprised mainly high molecular weight partially hydrolyzed polyacrylamide compounds. A serious shortcoming of the high molecular weight polyacrylamides is that the effective life of the gel as a profile modifier is seriously decreased by the natural temperature of oil-bearing formations having temperature above for example 60° C. and the hydrolysis caused thereby. This temperature effect is further complicated by the significant divalent ion concentrations found in most reservoir fluids, which can cause precipitation of the modifier. Lower molecular weight polyacrylamides which are partially hydrolyzed to about 10 mol percent carboxylate groups have also been used. The higher molecular weight polyacrylamides may be used at lower polymer concentration and hence have been considered more economical. However, the thermal stability of the higher molecular weight polyacrylamide materials is poorer than for the lower molecular weight polyacrylamides and the lower molecular weight materials have exhibited the best stability properties of the materials currently in use. Gelable compositions comprising optimum concentrations of low molecular weight polyacrylamide and cross-linking agent perform satisfactorily up to temperatures of about 90° C. However, at higher reservoir temperatures such as those occurring naturally in a number of locations, such as the North Sea, for example, temperatures at or above 120° C., frequently as high as about 150° C., or often higher, even up to 200° C. are commonly encountered. At these higher temperatures, even the low molecular weight polyacrylamide gelable composition loses all of its strength within a matter of days. Moreover, as has been mentioned, the polyacrylamides and partially hydrolyzed polyacrylamides are susceptible to degradation and precipitation in harsh environment reservoirs containing divalent ions such as $Ca^{2+}$, $Mg^{2+}$ and $Ba^{2+}$. Effective profile modification requires the gels to retain their strength and water diverting characteristics for a time sufficient to accomplish the flood at higher temperatures up to at least about 120° C., preferably up to about 150° C., and especially preferable to about 200° C. in harsh brine environments. At the higher temperatures shorter time periods are required.

N-sulfohydrocarbon-substituted acrylamide monomers and polymers comprising same are known. See, for example, U.S. Pat. No. 3,547,899, which discloses a homopolymer of poly(2-acrylamido-2-methylpropane-sulfonic acid). In U.S. Pat. No. 3,679,000, it is disclosed that polymers and copolymers of N-sulfohydrocarbon-substituted acrylamide monomers are useful as mobility control agents, i.e., as viscosifiers in polymer-flooding or fluid drive processes.

In commonly assigned copending application Ser. No. 622,899, filed June 21, 1984, now U.S. Pat. No. 4,573,533 a mobility control reagent comprising an aqueous composition of a polymer consisting of acrylamide units and units of 2-acrylamido-2-methylpropane-sulfonic acid or its salts, is disclosed which is resistant to viscosity degradation in the presence of divalent salt containing brines up to or at temperatures of about 90° C. These acrylamide/ 2-acrylamido-2-methylpropane-sulfonic acid copolymers, however, are generally not crosslinkable to form gels, and therefore are not suitable for extended profile modification applications.

Accordingly, it is an object of the present invention to provide a new and improved composition and method for profile modification operations which is effective at elevated temperatures of up to at least about 120° C. preferably up to about 150° C. and especially preferably up to about 200° C., even in harsh environment reservoirs.

SUMMARY OF THE INVENTION

Unexpectedly, in view of the foregoing, it has now been discovered that effective profile modification in high temperature reservoirs having formation temperatures of up to about 120° C., preferably up to 150° C., and especially preferably up to about 200° C. may be achieved using a gelable composition comprising a polymer which does not comprise acrylamide units per se.

More particularly, the present invention provides a new and improved gelable composition, useful for altering the fluid flow profile of a subterranean formation, which exhibits high temperature stability in the gelled state at temperatures up to about 150° C., said composition comprising:

(a) water;

(b) a water thickening amount of a water dispersible copolymer comprising:

(i) from about 30 to about 99 mol % of units of the formula:

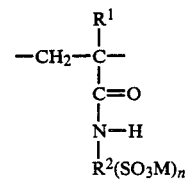

wherein $R^1$ is hydrogen, lower alkyl, or substituted lower alkyl; $R^2$ is a divalent or trivalent hydrocarbon radical or substituted hydrocarbon radical; M is hydrogen or one equivalent of a cation; and n is 1 or 2; and (ii) from about 1 to about 70 mol % of units derived from at least one other ethylenically unsaturated monomer copolymerizable with (i) bearing a carboxyl or carboxyl precursor functional group and (c) an amount of a polyvalent metal capable of crosslinking said copolymer to form a high temperature stable gel.

The concentration of the copolymer in the gelable composition may vary and the amount of copolymer required to form a satisfactory gel will generally depend upon the molecular weight of the copolymer, the number of crosslinkable sights per molecule, crosslinker concentration and the desired gel characteristics for a particular end use. Generally, and without limitation, in the gelable composition, the copolymer concentration should be at least 3 times the overlap concentration for the polymer, preferably at least 3-5 times the overlap concentration. Generally, insufficient overlap provides a poorer gel. Expressed differently, the concentration of the copolymer employed should be within the range referred to as the "concentrated region of polymers in solution." Generally good results are obtained wherein the copolymer concentration of the gelable composition is from about 0.5% to about 5.0% and preferably is from about 2.0 to about 4.0% based on the total weight of gelable composition.

As mentioned above, the concentration of the copolymer required to form satisfactory gels varies inversely with molecular weight of the copolymer. Generally, the molecular weight of the copolymer should be from about 100,000 to about 15 million, and preferably from about 500,000 to about 5.0 million expressed in terms of $M_w$.

The copolymers for use in the gelable composition as component (b) generally comprise (i) from about 30 to about 99 mol % of N-sulfohydrocarbon-substituted acrylamide monomers and (ii) from about 1 to about 70 mol % of units derived from at least one other ethylenically unsaturated monomer copolymerizable with the N-sulfohydrocarbon-substituted acrylamide monomer(s), said at least one other ethylenically unsaturated monomer containing at least one chelatable group. By chelatable group is meant a functional group capable of being crosslinked via polyvalent metal ions to form a crosslinked network or gel network of the copolymers. Generally and without limitation, the chelatable group will comprise a carboxyl or carboxyl precursor functional group, although any monomer bearing a chelatable group as defined above may be employed. Illustrative of other chelatable groups which may be employed in the comonomers (ii) include, for example, phosphate, phosphonate and hydroxylamine functional groups.

The mol % ratio of (i) N-sulfohydrocarbon-substituted acrylamide units to said (ii) units may vary depending on the final gel properties required or desired. In this connection, the gel strength depends upon the quantity of chelatable groups present contributed by the (ii) units, the strength of the metal chelate bond, molecular weight of the polymer, and salinity of the solution to be more fully described hereinafter. Polymer stability depends on the quantity of N-sulfohydrocarbon-substituted acrylamide units present.

In preferred embodiments, the copolymer is comprised of (i) sodium 2-acrylamido-2-methylpropanesulfonate units and (ii) sodium acrylate units. In addition, in preferred embodiments, the copolymers will comprise from about 40–99 mol % of (i) units and 1 to 60 mol % of (ii) units, and copolymers comprising from about 50 to about 99 mol % of (i) units and 1 to 49 mol % of (ii) units are especially preferred for long term gel stability at temperatures up to about 150° and preferably up to about 200° C.

The polyvalent metal ions for use as component (c) may comprise any polyvalent metal ions capable of crosslinking the copolymer component (b) to form a high temperature stable gel. Illustrative examples of some of these polyvalent metal ions include $Fe^{2+}$, $Fe^{3+}$, $Al^{3+}$, $Ti^{4+}$, $Zn^{2+}$, $Sn^{4+}$, $Cr^{3+}$, $Ce^{4'}$, $Zi^{4+}$, to name but a few. Generally, the polyvalent metal ions may be added as is, but in many in end use applications, the polyvalent metal ions may be added in the form of a redox couple, or in the form of a chelated complex, each being capable of generating the polyvalent metal ion crosslinking agents in situ, to provide flexibility with respect to onset of gelation times and placement of the gel at desired locations within the formation. Rate of reaction in each case will be determined by the difference in the redox potential or by the strength of the complex, respectively. The crosslinking agents and crosslinking methods will be more particularly described hereinafter.

The present invention provides alternate embodiments of the gelable composition. For example, instead of an aqueous gelable composition, the composition of this invention may be provided in the form of a solution, an inverted emulsion or as a dry product. Moreover, the composition may be provided in the form of a wet or dry two package gelation system.

In an alternate aspect of the present invention, there is provided a new and improved method for altering the fluid flow profile of a petroleum-bearing, underground formation penetrated by at least one wellbore to provide improved production of oil from the formation, said method comprising:

(a) injecting into said formation the gelable composition of the present invention defined above; and (b) permitting gelation of the copolymer to proceed until substantially complete. In accordance with an alternate method of the present invention, the gelable copolymer and the crosslinking polyvalent metal ion may be added separately in alternating slugs, to mix the polymer and crosslinking agent within the formation to generate the high temperature stable gel in situ. Using either embodiment of the present method, the gelable composition will preferentially travel to the more permeable zones within the formation and gel, rendering these zones less permeable to fluid flow. Modifying the fluid flow profile of the formation in this manner provides a substantial decrease in the volume ratio of water;oil produced from the formation at the production wells, thereby improving the overall oil recovery and economics of the operation. Moreover, the composition and method of the present invention permits effective profile modification in the temperature harsh brine reservoirs heretofore unattainable with prior art compositions and methods.

The compositions and methods of the present invention are also useful in sealing underground formations to be used as waste containment sites, whereby after treatment, an underground formation may be rendered impermeable to the flow of waste materials away from the site and impermeable to the flow of water into or through the site.

Other objects and advantages provided by the present invention will become apparent from the following detailed description of the invention and illustrative working Examples.

DETAILED DESCRIPTION OF THE INVENTION

In accordance with the present invention effective profile modification of high temperature and harsh brine environment reservoirs is provided with a gelable water-dispersible copolymer comprising:

(i) from about 30 to 99 mol % of units of the formula:

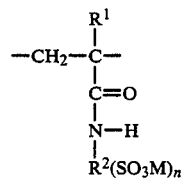

wherein $R^1$ is hydrogen, lower alkyl or substituted lower alkyl; $R^2$ is a divalent or trivalent hydrocarbon radical or substituted hydrocarbon radical; M is hydrogen or one equivalent of a cation; and n is 1 or 2; and (ii) from about 1 to about 70 mol % of units derived from at least one other ethylenically unsaturated monomer copolymerizable with (i) bearing a carboxyl or carboxyl-precursor functional group.

More particularly, the (i) units of the copolymer are derived from at least one N-sulfohydrocarbon-substituted acrylamide monomer having the formula set forth above. These monomeric units are represented by the above formula in which $R^1$ is hydrogen or a lower (as defined hereinafter) alkyl radical and $R^2$ is a divalent or trivalent hydrocarbon radical. As used herein, the term "hydrocarbon radical" includes aliphatic, cycloaliphatic and aromatic (including aliphatic- and cycloaliphatic-substituted aromatic) and aromatic-substituted aliphatic and cycloaliphatic radicals. It also includes cyclic radicals wherein the ring is completed through another portion of the molecule; that is, any two indicated substituents may together form a cyclic hydrocarbon radical.

The following are illustrative of divalent hydrocarbon radicals within the scope of this invention. Where a named radical has several isomeric forms (e.g., butylene), all such forms are included.

Methylene
Ethylene
Propylene
Butylene
Hexylene
Octylene
Decylene
—CH=CHCH$_2$
—C≡C—
—C≡C—CH$_2$
Phenylene
Tolylene
Xylylene
Naphthylene
—C$_6$H$_4$(CH$_2$)$_{11}$CH$_2$—

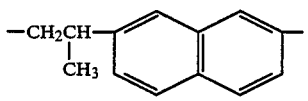

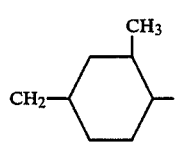

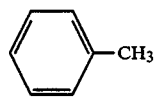

Cyclohexylene
Cyclopropylene
Methylenecyclopentylene

Trivalent radicals are similar to the above but have an additional hydrogen atom abstracted.

Many obvious variations of these radicals will be apparent to those skilled in the art and are included within the scope of the invention.

Substituted hydrocarbon, alkyl, aryl, alkylene, arylene, etc., radicals are considered fully equivalent to the hydrocarbon, alkyl, aryl, alkylene, arylene, etc., radicals and to be part of this invention. By "substituted" is meant radicals containing substituents which do not alter significantly the character of reactivity of the radical. Examples are:
Halide (fluoride, chloride, bromide, iodide)
Hydroxy
Ether (especially lower alkoxy)
Keto
Carboxy
Ester (especially lower carbalkoxy)
Aminoacyl (amide)
Amino
Nitro
Cyano
Thioether
Sulfoxy
Sulfone
Sulfonic acid ester, amide, etc.

In general, no more than about three such substituent groups will be present for each 10 carbon atoms in the radical Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for lower hydrocarbon radicals, the work "lower" denoting radicals containing up to seven carbon atoms. Still more preferably, they are lower alkylene or arylene radicals, most often alkylene.

In the formula, $R^1$ is hydrogen or lower alkyl but is preferably hydrogen or methyl, unusally hydrogen. $R^2$ may be any divalent or trivalent hydrocarbon radical, preferably lower alkylene or arylene and usually lower alkylene. In a preferred embodiment of this invention, $R^2$ is

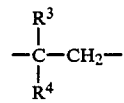

wherein $R^3$ is hydrogen or a lower alkyl radical, $R^4$ is a lower alkyl radical and the sulfonic acid group is attached to the unsubstituted methylene carbon.

Especially preferred monomers include:

2-Acrylamidoethanesulfonic acid
CH$_2$=CHCONHCH$_2$CH$_2$SO$_3$H
2-Acrylamidopropanesulfonic acid

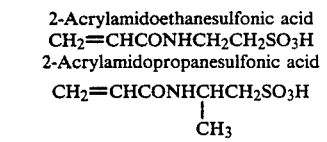

2-Acrylamido-2-methylpropanesulfonic acid

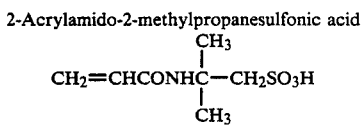

3-Methacrylamidopropanesulfonic acid

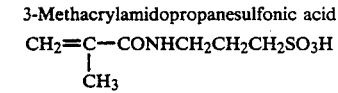

4-Methacrylamidocyclohexanesulfonic acid

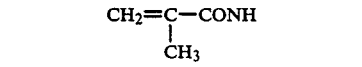

2-Acrylamido-2-phenylethanesulfonic acid

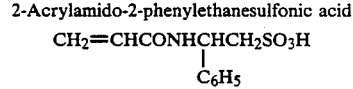

2-Acrylamido-2-phenylpropanesulfonic acid

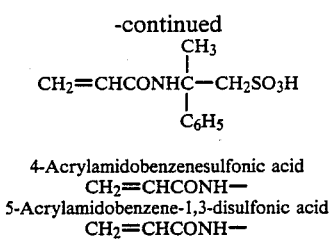

4-Acrylamidobenzenesulfonic acid
CH₂=CHCONH—
5-Acrylamidobenzene-1,3-disulfonic acid
CH₂=CHCONH—

From the standpoint of economy, ease of preparation, and polymerization, and effectiveness, the most desirable monomer is 2-acrylamido-2-methylpropanesulfonic acid or its salts, usually alkali metal or ammonium salts and preferably sodium or potassium salts. The term "N-sulfohydrocarbon-substituted acrylamide" when used hereinafter will refer to this class of compounds generally, with the understanding that the above-named compound is especially preferred.

The copolymers also comprise from about 1 to about 70 mol % of units derived from at least one other ethylenically unsaturated monomer containing at least one chelatable group. The preferred chelatable group or groups are carboxyl groups or carboxyl precursors. Illustrative monomers which may be incorporated into the copolymer to form the (ii) units include monoethylenically unsaturated carboxylic acids including: acrylic acid, methacrylic acid, crotonic, maleic, fumaric, itaconic and their respective alkali metal or ammonium salts, to name but a few. Especially preferred monomers from this group are acrylic acid and methacrylic acid.

Other monomers suitable for forming the (ii) units of the copolymer include monoethylenically unsaturated monomers bearing at least one carboxyl precursor. Illustrative examples of these other monomers include the hydroxyalkyl acrylates and methacrylates, e.g., hydroxyethyl acrylate, hydroxypropyl acrylate, hydroxymethyl methacrylate, hydroxyethyl methacrylate, maleic acid, esters of hydroxy maleic acid and the like.

The crosslinkable, water dispersible copolymers for use in the composition and method of the present invention may be prepared in bulk, solution, suspension or emulsion. Since the copolymers should be at least water-dispersible, if not water-soluble, it is convenient to prepare them in aqueous solution. Another method is to prepare an aqueous solution of the monomer or monomers and to suspend this solution in a water-immiscible solvent such as an aliphatic or aromatic hydrocarbon or halogenated hydrocarbon. Generally, the sulfonic acid monomer and monoethylenically unsaturated carboxylic acid monomer is converted to its alkali metal or ammonium salt prior to polymerization by means of a suitable alkaline reagent. When the copolymerization is effected in suspension, ordinary suspension agents known to those skilled in the art are used.

The polymerization may be promoted by typical initiators used in aqueous systems, especially peroxides, persulfates and the like. It has been found that the alkali metal salts, especially the sodium salts, of 2-acrylamido-2-methylpropane sulfonic acid may be polymerized in the absence of an initiator. Moreover, polymerization may be initiated by the various Azo-type initiators or actinic radiation, e.g. ultraviolet or electron beam, sources and methods may be used.

It is sometimes advantageous to carry out the polymerization in the presence of a small amount of chain transfer agent, to provide copolymer products having more uniform molecular weights, i.e. a narrower molecular weight distribution range. Suitable chain transfer agents are well known and will suggest themselves to those skilled in this art.

As has been mentioned above, the gelable composition of the present invention is for use as a profile modification agent and in its application the copolymer should be prepared so as to provide copolymers having a molecular weight, $M_w$, of from about 100,000 to about 15 million, preferably from about 500,000 to about 5 million. The polymer concentration should be at least 3, and preferably at least 3–5 times the overlap concentration of the polymer. Polymer concentration for copolymers of molecular weight within the range set forth above, will generally be from about 0.5% to about 5.0%, and preferably from about 2.0% to 4.0% by weight of the gelable composition.

The copolymers of the present invention will generally comprise from about 30 to 99 mol % of (i) units and from about 1 to 70 mol % of (ii) units. As has been mentioned above, the chelatable group containing (ii) units are responsible for the formation of the crosslinked, gel network, and the N-sulfohydrocarbon-substituted acrylamide or (i) units are responsible for high temperature and harsh environment stability of the network. In this connection, profile modification gels exhibiting intermediate use lives are provided by the present invention by employing as the copolymer, a copolymer containing lower mol percentages of (i) units within the ranges specified above, e.g. copolymers containing from about 30 to about 40 mol % of (i) units. For those applications wherein long term high temperature gel stability is desired or required, higher mol percentages of (i) units are utilized. Preferred copolymers comprise from about 40 to about 85 mol % of (i) units and from about 15 to 60 mol % of (ii) units. An especially preferred copolymer comprises a 50/50 mol % copolymer of units (i) and (ii).

The gelable composition of the present invention also comprises, as component (c), an amount of a polyvalent metal capable of crosslinking the copolymers to form a high temperature stable gel. Suitable polyvalent metals include: $Fe^{2+}$, $Fe^{3+}$, $Al^{3+}$, $Ti^{4+}$, $Zn^{2+}$, $Sn^{4+}$, $Cr^{3+}$, $Ce^{4+}$, $Zn^{4+}$, $Ba^{2+}$, $Ca^{2+}$, $Mg^{2+}$ and $Mn^{4+}$. The polyvalent metals may be added as an aqueous solution of their respective water-soluble salts, or as chelates, however, they are preferably added in the form of a redox couple.

More particularly, the crosslinking agents, component (c), are preferably added in the form of a redox couple wherein the redox couple comprises:

(i) at least one oxidizing agent comprising a water soluble compound of a polyvalent metal wherein the metal is present in its highest valence state and is capable of being reduced to a lower polyvalent valence state and being in a form normally unavailable for reaction until contacted with a reducing agent; and (ii) a reducing agent effective to reduce the higher valence metal in oxidizing agent (i) to a lower polyvalent valence state.

The oxidizing agents for use herein are watersoluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, are the presently preferred metal-containing compounds for use in the practice of the invention. The hexavalent chromium in these chromium compounds is reduced in situ to trivalent chromium by suitable reducing agents as discussed hereinafter. In the permanganate compounds the manganese is reduced from +7 valence to +4 valence as in $MnO_2$.

The amount of metal-containing compounds used in the practice of the invention will be an optimum amount, i.e., a small but finite amount which is more than incidental impurities, but which is effective or sufficient to cause subsequent gelation when the metal in the polyvalent metal compound is reduced to a lower valence state. The lower limit of the concentration of the starting metal-containing compound will depend upon several factors including the particular copolymer used, the concentration of copolymer in the water to be gelled, the water which is used, and the type of gel product desired. For similar reasons, the upper limit on the concentration of the starting metal-containing compound also cannot always be precisely defined. As a general guide, the amount of the starting polyvalent metal-containing compound used in preparing aqueous gels in accordance with the invention will be in the range of from 0.05 to 30, preferably 0.5 to 30, weight percent of the amount of the total polymer used. Those skilled in the art can determine the amount of starting polyvalent metal-containing compound to be used by simple experiments carried out in the light of this disclosure. For example, when brines such as are commonly available in producing oil fields are used as the water in preparing gels in accordance with the inventiion, less of the starting polyvalent metal-containing compounds is required than when distilled water is used. Gelation rates are frequently faster when using brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

The reducing agents which can be used herein include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, sodium thiourea and others, and nonsulfur-containing compounds such as hydroquinone, ferrous chloride, p-hydrazinobenzoic acid, hydrazine phosphite, hydrazine dichloride, and others. Some of the above reducing agents act more quickly than others. More particularly, rate of reduction depends on the reducing agent selected, pH, and temperature. For example, sodium thiosulfate usually reacts slowly in the absence of heat, e.g., requiring heating to about 50° C. The presently most preferred reducing agents are sodium thio-sulfate or thiourea. An especially preferred reducing agent for use in the gelable compositions of the present invention is thiourea.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be at least 150, preferably at least about 200, percent of the stoichiometric amount required to reduce the metal in the starting polyvalent to said lower valence state, e.g. +6 Cr to +3 Cr. Those skilled in the art can determine the amount of reducing agent to be used by simple experiments carried out in the light of this disclosure.

The use of redox couples provides additional flexibility in handling, and positioning of the gelable composition so that rigid gel formation can be effected in the desired locations, e.g. the high permeability zones, of the oil-bearing formation. This is primarily because the time between mixing and the onset of gelation is generally proportional to the redox potential of the redox couple selected. Therefore, by carefully selecting the oxidizing agent and reducing agent comprising the redox couple, the user can regulate the time involved prior to gel formation, such that it can be placed at any pre-determined location by regulation of the fluid flow rate of the carrier or delivery fluids.

The gelable compositions of the present invention may be employed as profile modification agents in accordance with a number of contemplated methods. For example, either the polyvalent metal compound or the reducing agent, if used, can be first added to a solution of the copolymer in water or other aqueous medium, or the metal containing compound and the reducing agent can be added simultaneously to a solution or an aqueous medium containing the copolymers. Generally speaking, where convenient, the preferred method is to first disperse the copolymer in the water or other aqueous medium. The reducing agent is then added to the dispersion with stirring. The metal-containing compound is then added to the solution or aqueous medium containing the copolymer and the reducing agent, with stirring. The newly formed lower valence metal ions, for example, +3 chromium obtained for +6 chromium, effect rapid crosslinking of the copolymers and gelation of the solution or aqueous medium containing same.

One presently preferred method of preparing the aqueous gels is to prepare the gel while the components thereof are being pumped into the well. This method comprises preparing a base solution of the copolymer, adding to this base solution (a) a polyvalent metal compound such as sodium dichromate or (b) a reducing agent such as sodium thiosulfate or thiourea pumping the base solution down the well, and during pumping adding to said base solution the other of the reagents (a) and (b) which was not previously added thereto. It is also within the scope of the invention to incorporate all the components of the aqueous gel into a stream of water while it is being pumped, e.g., into a well. For example, copolymer can be added first to the flowing stream of water and the other components added subsequently in any suitable order. Turbulent flow conditions in the pipe will provide proper mixing.

It is also within the scope of the invention to prepare a dry mixture of the copolymer, the metal-containing compound, and the reducing agent, in proper proportions, and then add this dry mixture to the proper amount of water.

An advantage of the invention is that ordinary ambient temperatures and other conditions can be used in practically all instances in preparing the aqueous gels of the invention or aqueous medium containing same.

Aqueous gels in accordance with the invention can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of copolymer, the type and amount of starting polyvalent metal compound used and the type and amount of reducing agent used.

As stated above, the gelable compositions and gels produced therewith are particularly useful as profile modification agents in enhanced oil recovery operations in high temperature and/or harsh environment reservoirs. The gelable compositions of this invention are useful for decreasing the permeability of selected portions of underground formations prior to or during secondary or tertiary recovery operations and also for water shut off treatments in producing wells. For example, in an enhanced oil recovery operation, a conventional waterflood or gas drive is performed in the conventional manner until the drive fluid breaks through into the production well in excessive amounts. The gelable composition of the present invention is then pumped down the injection well and into the formation in any suitable manner and in any suitable amount, and for any desired length of time sufficient to obtain the desired in-depth penetration, gel formation and consequent permeability reduction in the high permeability zones of the formation. Usually, an in-depth penetration of from 10 to 1,000, preferably 25 to 900, feet from the injection well will be sufficient. However, this can vary from formation to formation, and penetrations outside said ranges can be used. For example, there can be injected into the formation via the injection well from about 0.001 to about 0.5 pore volumes of gelable composition in accordance with the invention, or by injecting a slug of about 200 to 5,000 barrels of gelable composition into the well and then into the formation. Injection in one of the above manners will provide a flood front adjacent the oil to be produced. If desired, an ordinary brine or water can then be employed to drive the gelable composition to the desired location of the formation. If desired, in order to avoid any sharp demarcations in viscosity or mobility of the gel, which could adversely affect the relative mobility of the flood medium and the oil and cause channeling, the viscosity or concentration of the gel can gradually be lessened through a series of incremental decreases rather than discontinuing the injection thereof abruptly.

In another embodiment of the invention, the formation can be treated prior to carrying to the fluid drive secondary recovery operation. This embodiment is particularly applicable where there is good knowledge of the nature of the formation. Thus, in a formation where the oil-bearing strata are interspersed with more permeable porous strata which contain no oil or an insufficient amount of oil to make secondary recovery operations economical, but which more permeable strata would still act as a thief zone, the formations can be treated in accordance with the invention prior to initiating the fluid drive operation.

In still another embodiment, the invention can be applied to producing wells, either oils wells or gas wells, where there is a more porous nonhydrocarbon-bearing strata adjacent the hydrocarbon-bearing strata. For example, such a condition can exist where there is water sand adjacent the hydrocarbon-bearing said and the water intrudes into the borehole and interferes with the production of hydrocarbons. In such instances, the formation can be treated in accordance with the invention to shut off the flow of water. The method of carying out such a water shutoff treatment is substantially the same as described above in connection with fluid drive operations.

It is also within the scope of the invention to carry out the gel injection techniques of the invention periodically or intermittently, as needed, during the course of a fluid drive secondary operation, or during the production of oil from a producing well.

In all of the above operations, the injection of the gel of the invention can be carried out in any conventional manner. If desired, a gel of suitable viscosity or concentration can be injected as the drive fluid per se. Gels injected in accordance with the invention can be prepared in advance, stored in suitable tanks, and then pumped into the well; or said gels can be formed in a conduit leading to the injection well, or in the tubing in the well itself, and then injected into the formation. Thus, the required amounts of the mixture of copolymer, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The gelable compositions are particularly useful as profile modification agents for high temperature reservoirs and are capable of forming stable gels having useful gel lives of more than six months at reservoir temperatures of up to about 120° C. and more preferably up to from about 120° C.–150° C. Moreover, the crosslinked gels of the present invention are stable for prolonged periods in harsh environment reservoirs and the gels generally do not shrink, decompose or exhibit syneresis after prolonged exposure to concentrated brines. Generally, a harsh environment reservoir may be defined as a reservoir having a temperature above about 60° C. and formation water or brine having a concentration of divalent salts of calcium and magnesium, and especially $Ca^{2+}$, of above about 200 ppm. Under harsh environment conditions prior art gel compositions based on polyacrylamides are not satisfactory.

The following working Examples are provided by way of illustration only to enable those skilled in this art to better understand and practice the present invention.

DETAILED DESCRIPTION OF THE PREFERRED EMBODIMENTS

In each of the following examples, several polymers and copolymers were tested as the polymeric component (B) of the gelable composition and each of the resulting gels were evaluated for high temperature stability performance at various elevated temperatures. For comparison, prior art gelable compositions comprising hydrolyzed polyacrylamides as the polymeric component (B) were also evaluated.

In each of the following examples, the copolymeric materials comprising N-sulfohydrocarbon-substituted acrylamide units and sodium acrylate or acrylamide units were prepared in accordance with well known conventional methods which may be summarized in terms of preferred reagents, as follows:

In a reaction vessel, equipped with nitrogen purge, heating element and mechanical stirrer is added an amount of a concentrated aqueous sodium hydroxide solution and the solution is purged with nitrogen. Thereafter, under stirring, approprite relative amounts of 2-acrylamido-2-methylpropane sulfonic acid and acrylic acid are added to provide a monomer solution containing from about 10 to 30% by weight solution of the monomers as salts. The pH of the monomer solution is adjusted to between about 6.0 to about 8.0 with an appropriate acid. Thereafter, conventional amounts of a chain transfer agent, such as about 5 ppm based on monomers of propylene glycol, and a sequestrant, such as about 100 ppm, same basis, of diethylenetriaminepentaacetic acid may be added. The temperature is adjusted to between about 40°-50° C. and a conventional amount of a polymerization initiator is added, such as about 200 ppm of azobisisobutyronitrile. The solution thickens as copolymerization takes place exothermically, yielding the desired copolymer of sodium 2-acrylamido-2-methylpropanesulfonate and sodium acrylate, which is partially dried at 60°-70° C. under vacuum and pulverized, after which drying is completed.

In each of the following examples the polyvalent metal crosslinking agents were provided in the form of a redox couple wherein the oxidizing agent employed was sodium dichromate and the reducing agent employed was selected from sodium metabisulfite, sodium thiosulfate or sodium thiourea.

The gelable compositions were prepared and tested in a standard harsh environment brine containing 5.0% NaCl and 0.5% CaCl$_2$ as the water component (A), to more closely simulate actual reservoir conditions. The gelable compositions were prepared by dissolving the polymeric component in harsh brine to provide a solution having the polymer concentration indicated. The dichromate oxidizing agent, as a 10% aqueous solution, was added and well blended. Thereafter, the reducing agent selected was added and mixed well. The reducing agents were also added in the form of a 10% aqueous solution.

A variety of samples were tested for high temperature gel stability in harsh brine by placing aliquot portions of gelable compositions into sealed glass ampoules, which were placed in a controlled temperature oven and checked periodically for retained gel characteristics. Performance of the compositions tested was evaluated by visual inspection of the gels after each period by tipping the glass ampoules on their sides. An acceptable gel performance was characterized by a general retention of the original gel properties, i.e., macroscopic gel stiffness. In the following examples a pass grade was given to gel samples, which when tipped: (a) retained their shape against the bottom and sidewalls of the ampoule with the top surface of the gel remaining verticle at 90° to the sidewall and the top surface was either rigid or springy; (b) generally retained the shape of the container but exhibited moderate shrinkage with or without exuding water; and (c) generally retained the shape of the container but exhibited a moderate amount of viscoelasticity such that the top surface of the gel flowed slightly to form a 45° angle to the sidewall. A failing grade was assigned to those gels tested which were characterized by the formation of partially or completely fluid phases upon aging. Generally, two kinds of catastrophic gel failure are noted in the examples. In the first type of gel failure, when the ampoule was tipped on its side, the gelled network had completely broken down to a free flowing liquid state. The liquified gel flowed as the ampoule was tipped such that the top surface of the gel became parallel to the sidewall. This type of failure is identified by an asterisk (*) in the examples.

The second kind of catastrophic gel failure noted in the examples is syneresis wherein the gelled network collapses in on itself and is characterized by the formation of a fluid slurry of discrete gel particles in water. This type of failure is identified as double asterisk (**), in the examples.

EXAMPLES 1-12

In the following Examples a number of gelable compositions were prepared and tested for high temperature gel stability at both 90° C. and 120° C. The compositions were prepared by thoroughly admixing the ingredients in the proportions specified. All compositions were prepared in a standard harsh environment brine containing 5.0% NaCl and 0.5% CaCl$_2$ as the water component. For comparison, the compositions of the present invention were tested against identical compositions except that a partially hydrolyzed polyacrylamide polymer, a homopolymer of sodium 2-acrylamido-2-methylpropanesulfonate and a homopolymer of sodium acrylate were employed as polymer component (b).

In Table 1, polymer viscosities denoted by superscript were determined as follows:

a. Measured in a Brookfield viscosimeter, 5% polymer in NaCl at 25° C., #2 spindle and 12 rpm.

b. Measured in a Brookfield viscosimeter equipped with U.L. adapter, 5% polymer in 1N NaCl at 25° C., 12 rpm.

c. Measured in a Brookfield viscosimeter equipped with U.L. adapter, 0.5% polymer in 1N NaCl at 25° C., 60 rpm.

The compositions prepared and the results obtained are set forth in Table 1, as follows:

TABLE 1

| | CEL STABILITY AT 90° C. and 120° C. | | | | | | | |
|---|---|---|---|---|---|---|---|---|
| | EXAMPLE | | | | | | | |
| | A | B | C | D | E | F | 1 | 2 |
| A. Composition: | | | | | | | | |
| 1. Polymer component: (mol %) | | | | | | | | |
| Acrylamide | 90 | 90 | 90 | 30 | — | — | — | — |
| Sodium salt of 2-acrylamido-2-methylpropanesulfonic acid | — | — | — | 70 | 100 | — | 85 | 85 |
| Sodium Acrylate | 10 | 10 | 10 | — | — | 100 | 15 | 15 |
| 2. Oxidizing Agent (ppm) Sodium dichromate | 2000 | 2000 | 3000 | 1500 | 3000 | 3000 | 2000 | 2000 |

TABLE 1-continued

GEL STABILITY AT 90° C. and 120° C.

| 3. Reducing Agent (ppm) | | | | | | | | |
|---|---|---|---|---|---|---|---|---|
| Sodium thiosulfate | — | — | — | — | 3000 | 3000 | — | — |
| Sodium thioures | 2000 | 2000 | 3000 | 1500 | — | — | 2000 | 2000 |
| B. Properties: | | | | | | | | |
| 1. Polymer viscosity (mPa.S) | 26.1[a] | 26.1[a] | 26.1[a] | — | 3.9[c] | (mw = 90k) | 414[b] | 414[b] |
| 2. % polymer in composition | 2.5 | 3.75 | 3.75 | 3.0 | 3.75 | 3.75 | 2.5 | 3.75 |
| 3. 90° C. temperature stability, days | 82* | >169 | >134 | No Gel | — | — | >176 | >176 |
| 4. 120° C. temperature stability, days | 7* | 14* | 47* | No Gel | No Gel | No Gel | >176 | >176 |

| | EXAMPLE | | | | | | | | | |
|---|---|---|---|---|---|---|---|---|---|---|
| | 3 | 4 | 5 | 6 | 7 | 8 | 9 | 10 | 11 | 12 |
| A. Compositions: | | | | | | | | | | |
| 1. Polymer component: (mol %) | | | | | | | | | | |
| Acrylamide | — | — | — | — | — | — | — | — | — | — |
| Sodium salt of 2-acrylamido-2- | 65 | 85 | 75 | 55 | 50 | 30 | 30 | 30 | 30 | 30 |
| Sodium Acrylate | 15 | 15 | 25 | 35 | 50 | 70 | 70 | 70 | 70 | 70 |
| 2. Oxidizing Agent (ppm) | 3000 | 3000 | 3000 | 3000 | 3000 | 1000 | 3000 | 4200 | 6000 | 8000 |
| Sodium dichromate | | | | | | | | | | |
| 3. Reducing Agent (ppm) | | | | | | | | | | |
| Sodium thiosulfate | — | — | 3000 | 3000 | — | 1000 | 3000 | 4200 | 6000 | 8000 |
| Sodium thiourea | 3000 | 3000 | — | — | 3000 | — | — | — | — | — |
| B. Properties: | | | | | | | | | | |
| 1. Polymer viscosity (mPa.S) | 414[b] | 405[b] | 405[b] | 418[b] | 825[b] | 3.3[c] | 3.3[c] | 3.3[c] | 3.3[c] | 3.3[c] |
| 2. % polymer in composition | 3.75 | 3.75 | 3.75 | 3.75 | 3.75 | 3.75 | 3.75 | 3.75 | 3.75 | 3.75 |
| 3. 90° C. temperature stability, days | >141 | — | — | — | — | — | — | — | — | — |
| 4. 120° C. temperature stability, days | >176 | 326* | 88[1] | 326* | 217* | No | 2* | 2* | 2* | 2** |

[1]experiment terminated for test reasons.

The results of Table 1 demonstrate the improved high temperature stability of gelable compositions within the scope of the present invention as compared with compositions employed in the prior art. More particular, the partially hydrolyzed polyacrylamide based compositions shown in Examples A, B and C generally performed well at 90° C. and at optimum levels of polymer and crosslinker, as shown in Examples B and C. At 120° C., however, the partially hydrolyzed polyacrylamide based gels lost all their strength in a matter of days. The 70/30 copolymer of 2-acrylamido-2-methylpropanesulfonic acid/acrylamide shown in Example D did not form a gel at any stage demonstrating the necessity of a chelatable group to be present within the polymer chain. The 100 mol % 2-acrylamido-2-methylpropanesulfonic acid and sodium acrylate homopolymers, also did not gel. The compositions of the present invention, shown in Examples 1–7, generally demonstrated good high temperature stability at 120° C., for a period of about 6 months before some of them lost their strength. Examples 8–12 are also within the scope of the present invention and the poor results obtained were caused by the failure to employ an optimum amount of crosslinker for the particular polymer used. Optimum crosslinker concentration for the 30/70 Na salt of 2-acrylamido-2-methylpropanesulfonic acid/Na Acrylate copolymer employed therein is probably above the 6000 ppm or lesser amounts shown in Examples 8, 9, 10 and 11, but below the 8000 ppm amount used in Example 12, the syneresis of the gel generally indicates too much crosslinker. The methods for determining optimum crosslinker concentration for various polymers within the scope of this invention will be more fully explored and set forth in the ensuing examples

EXAMPLES 13–31

The following examples are provided to better illustrate the many factors upon which satisfactory gel performance may depend for a given gelable system in any particular reservoir environment. As persons skilled in this art will appreciate, particularly those familiar with the prior art polyacrylamide, polysaccharides and cellulose ether based-gelable compositions heretofore employed as profile modification agents, a successful system must be designed after preliminary experiments to optimize gel performance after considering a number of factors including:

(i) the polymer solids content of the gelable composition;
  (ii) the number of crosslinkable sites per molecule;
  (iii) the amount of polyvalent metal ion crosslinking agent, expressed as a ratio of crosslinking metal cations/carboxylate anions;
  (iv) the ratio of reducing agent to oxidizing agent;
  (v) the total dissolved solids content of the brine used; and
  (vi) the amount of other oxidizing agents present, such as dissolved oxygen, in the composition or reservoir.

Each of the above-identified factors may play an important role in contributing to the long term high temperature strength and stability of the composition and therefore its effectiveness as a profile modification agent in high temperature, harsh environment reservoirs.

The following examples were designed to examine the influence on gel performance of each of the above-identified factors employing a 50/50 Na salt of 2-acrylamido-2-methylpropanesulfonic acid/Na Acrylate copolymer as the polymer component (b) and a crosslinking redox couple comprising sodium dichromate as the oxidizing agent and sodium thiosulfate as the reducing agent. High temperature stability performance of the compositions tested was performed in accordance with the methods of Examples 1–12. The compositions and conditions and the results obtained are set forth in Table II, as follows:

whereas Example 19 failed. Similar results are shown by comparing Example 22 with Example 25.

TABLE 2
GEL STABILITY UNDER VARIOUS CONDITIONS USING
$Na_2CR_2O_7/Na_2S_2O_3$ AS CROSSLINKER

| | EXAMPLE | | | | | | | | | |
|---|---|---|---|---|---|---|---|---|---|---|
| | 13 | 14 | 15 | 16 | 17 | 18 | 19 | 20 | 21 | 22 |
| COMPOSITION | | | | | | | | | | |
| 50/50 Na salt of 2-acrylamido-2-methylpropanesulfonic acid/Na Acrylate Viscosity, mPa.S | 3.8 | 3.8 | 3.8 | 3.8 | 3.8 | 4.8 | 4.8 | 3.8 | 4.8 | 3.8 |
| $Na_2Cr_2O_7$ (ppm) | 1000 | 2000 | 3000 | 3000 | 3400 | 3000 | 3000 | 3600 | 2500 | 3800 |
| $Na_2S_2O_3$ (ppm) | 1000 | 2000 | 9000 | 3000 | 10,200 | 9,000 | 9,000 | 10,800 | 8600 | 11,400 |
| Milliequivalents $Cr^{3+}$/Millimoles $NaCOO^-$ | 0.066 | 0.13 | 0.198 | 0.199 | 0.22 | 0.24 | 0.24 | 0.24 | 0.25 | 0.25 |
| Gel solids, % | 3.75 | 3.75 | 3.75 | 3.75 | 3.75 | 3.0 | 3.0 | 3.75 | 2.5 | 3.75 |
| Brine, TDS, ppm × $10^3$ | 1.1 | 1.1 | 1.1 | 1.1 | 55 | 1.1 | 55 | 55 | 1.1 | 1.1 |
| pH | 7.3 | 6.94 | 6.18 | 6.73 | 5.88 | 6.7 | 5.7 | 5.93 | 6.9 | 6.18 |
| PROPERTIES | | | | | | | | | | |
| AGING TEMPERATURE, °C. | 120 | 120 | 120 | 120 | 120 | 120 | 120 | 120 | 120 | 120 |
| STABILITY, DAYS | 14, No Gel | 14, No Gel | 139* | 14, No Gel | 141* | >103, | 103* | 141* | 43* | >139, |

| | EXAMPLE | | | | | | | | |
|---|---|---|---|---|---|---|---|---|---|
| | 23 | 24 | 25 | 26 | 27 | 28 | 29 | 30 | 31 |
| COMPOSITION | | | | | | | | | |
| 50/50 Na salt of 2-acrylamido-2-methylpropanesulfonic acid/Na Acrylate Viscosity, mPa.S | 4.8 | 3.8 | 3.8 | 3.8 | 3.8 | 3.8 | 3.8 | 3.8 | 3.8 |
| $Na_2Cr_2O_7$ (ppm) | 2500 | 3800 | 3800 | 4000 | 4200 | 4600 | 4600 | 5000 | 5500 |
| $Na_2S_2O_3$ (ppm) | 7800 | 3800 | 11,400 | 12,000 | 12,600 | 13,800 | 13,800 | 15,000 | 16,500 |
| Milliequivalents $Cr^{3+}$/Millimoles $NaCOO^-$ | 0.25 | 0.25 | 0.25 | 0.26 | 0.28 | 0.30 | 0.30 | 0.33 | 0.36 |
| Gel solids, % | 2.5 | 3.75 | 3.75 | 3.75 | 3.75 | 3.75 | 3.75 | 3.75 | 3.75 |
| Brine, TDS, ppm × $10^3$ | 55 | 55 | 55 | 55 | 55 | 1.1 | 55 | 55 | 1.1 |
| pH | 5.7 | 5.85 | 5.91 | 5.94 | 5.96 | 6.47 | 5.92 | 5.95 | 6.43 |
| PROPERTIES | | | | | | | | | |
| AGING TEMPERATURE, °C. | 120 | 120 | 120 | 120 | 120 | 120 | 120 | 120 | 120 |
| STABILITY, DAYS | 66* | 145* | 145* | >141 | >141 | >139 | >140 | >140 | 22* |

As shown by the data of Table 2, satisfactory high temperature gel performance for profile modification applications depends on a number of variables presented in any given reservoir setting. More particularly, in Table 2, Examples 13–31 are arranged in order of increasing chromium ion to carboxylate ion ratio. The ratios expressed in Table 2 are milliequivalents $Cr^{3+}$ to millimoles of carboxylate. Actual chromium to carboxylate ratios will be three times the figure shown in the Table, because of redox stoichiometry involved. As shown by Examples 13–31, the ratio of chromium ion to carboxylate ion must be sufficiently high to cause gelling, but not so high that syneresis occurs. Considering only this ratio as the factor, it is apparent that the $Cr^{3+}/COO^-$ ratio should be at least 0.2, preferably at least about 0.25 and less than about 0.36, i.e., compare Examples 18–30 with Examples 13–17 on the one hand and Example 31 on the other.

The data of Table 2 also indicate that an effective amount of crosslinker, e.g. $Cr^{3+}/COO^-$ ratio, may also vary depending on the concentration of other ions present, e.g., the total dissolved solids (TDS) in the brine, in this case as NaCl and $CaCl_2$. In general, it may be stated that harsher brines are less forgiving. Compare Examples 18 and 19, which are otherwise identical trials employing a $Cr^{3+}/COO^-$ ratio of 0.24 which is on the low side, wherein Example 18 was run in a low salt brine and Example 19 in harsh brine. Example 18 passed, The data of Table 2 further demonstrate that in addition to the $Cr^{3+}/COO^-$ ratio and brine salinity, the polymer must be present in a sufficiently high amount to permit a crosslinked network or gel to form. Considering this factor, as shown by Examples 21 and 23, a % gel solids of 2.5% is not sufficient, but Example 18 indicates that a gel solids of at least 3.0% appears to be sufficient.

Table 2 shows that in order to achieve acceptable high temperature stable gels for profile modification at temperatures of about 120° in harsh environments using a 50/50 Na salt of 2-acrylamido-2-methylpropanesulfonic acid/Na Acrylate copolymer, the gelable composition put in place should contain at least about 3.0% gel solids and should be crosslinked with an amount of chromium 3+ ion sufficient to provide a $Cr^{3+}/COO^-$ ratio of from about 0.25 to about 0.35, and that in less harsh reservoirs, variations outside these ranges can provide acceptable results.

EXAMPLES 32–84

In the following Examples, gelable compositions comprising a 50/50 Na salt of 2-acrylamido-2-methylpropanesulfonic acid/Na Acrylate copolymer and a sodium dichromate/thiourea redox couple were evaluated for high temperature stability performance under a variety of conditions in accordance with the methods of Examples 13–31. The compositions prepared and results obtained are set forth in Table 3, as follows:

TABLE 3
GEL STABILITY UNDER VARYING CONDITIONS USING $Na_2CR_2O_7/(NH_2)_2CS$ AS CROSSLINKER

TABLE 3-continued

| | EXAMPLE | | | | | | | | | | | |
|---|---|---|---|---|---|---|---|---|---|---|---|---|
| | 32 | 33 | 34 | 35 | 36 | 37 | 38 | 39 | 40 | 41 | 42 | 43 |
| COMPOSITION | | | | | | | | | | | | |
| 50/50 Na salt of 2-acrylamido-2-methylpropanesulfonic acid/Na Acrylate Viscosity, mPa.S | — | — | — | 3.8 | — | — | — | — | — | — | — | — |
| $Na_2Cr_2O_7$, ppm | 3000 | 3038 | 3400 | 3400 | 3010 | 3005 | 3005 | 3005 | 4210 | 4210 | 4210 | 4210 |
| $(NH_2)_2CS$, ppm | 9000 | 18240 | 10200 | 10200 | 13525 | 22540 | 13525 | 22540 | 18945 | 18945 | 31560 | 31560 |
| Milliequivalents $Cr^{3+}$/Millimoles $NaCOO^-$ | 0.20 | 0.20 | 0.22 | 0.22 | 0.2374 | 0.2375 | 0.237 | 0.2375 | 0.2375 | 0.2375 | 0.2375 | 0.2375 |
| Gel Solids, % | 3.75 | 3.75 | 3.75 | 3.75 | 3.125 | 3.125 | 3.125 | 3.125 | 4.375 | 4.375 | 4.375 | 4.375 |
| Brine, TDS, ppm × $10^3$ | 30.6 | 55 | 30.6 | 55 | 33 | 33 | 77 | 77 | 33 | 77 | 33 | 77 |
| pH | 6.1 | 6.0 | 6.2 | 5.97 | 6.2 | 6.2 | 5.9 | 5.9 | 6.2 | 6.1 | 5.9 | 6.0 |
| PROPERTIES | | | | | | | | | | | | |
| AGING TEMPERATURE, °C. | 120 | 120 | 120 | 120 | 120 | 120 | 120 | 120 | 120 | 120 | 120 | 120 |
| STABILITY, DAYS | >46 | 85* | >58 | 141* | 89* | 82* | 82* | 84* | >83, | 83* | >90 | >89 |

GEL STABILITY UNDER VARIOUS CONDITIONS USING $Na_2CR_2O_7/(NH_2)_2CS$ AS CROSSLINKER

| | EXAMPLE | | | | | | | | | | | | |
|---|---|---|---|---|---|---|---|---|---|---|---|---|---|
| | 44 | 45 | 46 | 47 | 48 | 49 | 50 | 51* | 52 | 53 | 54 | 55 | 56 |
| COMPOSITION | | | | | | | | | | | | | |
| 50/50 Na salt of 2-acrylamido-2-methylpropanesulfonic acid/Na Acrylate Viscosity, mPa.S | 4.8 | 4.8 | — | — | — | — | 3.8 | 3.4 | — | 4.8 | 4.8 | 3.4 | 3.8 |
| $Na_2Cr_2O_7$, ppm | 3000 | 3000 | 3000 | 3600 | 3600 | 3600 | 3600 | 3600 | 3600 | 2500 | 2500 | 3800 | 3800 |
| $(NH_2)_2CS$, ppm | 9000 | 9000 | 9000 | 7200 | 10800 | 10800 | 10800 | 10800 | 10800 | 7500 | 7500 | 22800 | 11400 |
| Milliequivalents $Cr^{3+}$/Millimoles $NaCOO^-$ | 0.24 | 0.24 | 0.24 | 0.24 | 0.24 | 0.24 | 0.24 | 0.24 | 0.24 | 0.25 | 0.25 | 0.25 | 0.25 |
| Gel Solids, % | 3.0 | 3.0 | 3.0 | 3.75 | 3.75 | 3.75 | 3.75 | 3.75 | 3.75 | 2.5 | 2.5 | 3.35 | 3.75 |
| Brine, TDS, ppm × $10^3$ | 1.1 | 55 | 99 | 30.6 | 30.6 | 30.6 | 55 | 55 | 99 | 1.1 | 55 | 1.1 | 1.1 |
| pH | 6.6 | 5.5 | 6.0 | 6.2 | 6.2 | 6.2 | 5.2 | 6.0 | 6.1 | 6.7 | 5.7 | 6.6 | 6.6 |
| PROPERTIES | | | | | | | | | | | | | |
| AGING TEMPERATURE, °C. | 120 | 120 | 120 | 120 | 120 | 120 | 120 | 120 | 120 | 120 | 120 | 120 | 120 |
| STABILITY, DAYS | 102* | 102* | >31 | >23 | >23 | >38 | 141* | >48 | >48 | 4 No Gel | 44* | >100 | >101 |

GEL STABILITY UNDER VARIOUS CONDITIONS USING $Na_2CR_2O_7/(NH_2)_2CS$ AS CROSSLINKER

| | EXAMPLE | | | | | | | | | | | |
|---|---|---|---|---|---|---|---|---|---|---|---|---|
| | 57 | 58 | 59 | 60 | 61 | 62 | 63 | 64 | 65 | 66 | 67 | 68 |
| COMPOSITION | | | | | | | | | | | | |
| 50/50 Na salt of 2-acrylamido-2-methylpropanesulfonic acid/Na Acrylate Viscosity, mPa.S | 3.8 | 4.1 | 4.1 | 3.8 | — | — | — | — | — | — | — | — |
| $Na_2Cr_2O_7$, ppm | 3800 | 3800 | 3800 | 4000 | 2780 | 4180 | 4180 | 4180 | 4180 | 4180 | 4180 | 4180 |
| $(NH_2)_2CS$, ppm | 11400 | 11400 | 11400 | 12000 | 16710 | 25080 | 8360 | 12540 | 12540 | 25080 | 37620 | 25080 |
| Milliequivalents $Cr^{3+}$/Millimoles $NaCOO^-$ | 0.25 | 0.25 | 0.25 | 0.26 | 0.275 | 0.275 | 0.275 | 0.275 | 0.275 | 0.275 | 0.275 | 0.275 |
| Gel Solids, % | 3.75 | 3.75 | 3.75 | 3.75 | 2.5 | 3.75 | 3.75 | 3.75 | 3.75 | 3.75 | 3.75 | 3.75 |
| Brine, TDS, ppm × $10^3$ | 1.1 | 1.1 | 1.1 | 55 | 55 | 1.1 | 55 | 55 | 55 | 55 | 55 | 99 |
| pH | 6.75 | 6.9 | 6.5 | 5.19 | 6.1 | 6.3 | 6.0 | 6.0 | 6.0 | 6.0 | 6.0 | 5.9 |
| PROPERTIES | | | | | | | | | | | | |
| AGING TEMPERATURE, °C. | 120 | 120 | 120 | 120 | 120 | 120 | 120 | 120 | 120 | 120 | 120 | 120 |
| STABILITY, DAYS | >138 | >96 | >108 | >141 | 84* | >83 | >47 | >47 | >83 | >84 | >82 | >82 |

GEL STABILITY UNDER VARIOUS CONDITIONS USING $Na_2CR_2O_7/(NH_2)_2CS$ AS CROSSLINKER

| | EXAMPLE | | | | | | | | | | |
|---|---|---|---|---|---|---|---|---|---|---|---|
| | 69 | 70 | 71 | 72 | 73 | 74 | 75 | 76 | 77 | 78 | 79 |
| COMPOSITION | | | | | | | | | | | |
| 50/50 Na salt of 2-acrylamido-2-methylpropanesulfonic acid/Na Acrylate Viscosity, mPa.S | — | 3.8 | 3.8 | 3.8 | — | — | — | — | — | — | — |
| $Na_2Cr_2O_7$, ppm | 1570 | 4200 | 4600 | 4600 | 3955 | 3955 | 3950 | 3955 | 5540 | 5540 | 5535 |
| $(NH_2)_2CS$, ppm | 33420 | 12600 | 13800 | 13800 | 7800 | 29665 | 17780 | 29655 | 24930 | 41515 | 24910 |
| Milliequivalents $Cr^{3+}$/Millimoles $NaCOO^-$ | 0.275 | 0.28 | 0.30 | 0.30 | 0.3125 | 03125 | 0.3125 | 0.3125 | 0.3125 | 0.3125 | 0.3125 |
| Gel solids, % | 5.0 | 3.75 | 3.75 | 3.75 | 3.125 | 3.125 | 3.125 | 3.125 | 4.375 | 4.375 | 4.375 |
| Brine, TDS, ppm × $10^3$ | 55 | 55 | 1.1 | 55 | 35 | 33 | 77 | 77 | 33 | 33 | 77 |
| pH | 6.2 | 5.55 | 6.72 | 5.67 | 6.1 | 6.1 | 5.8 | 5.9 | 6.2 | 6.3 | 6.0 |
| PROPERTIES | | | | | | | | | | | |
| AGING TEMPERATURE, °C. | 120 | 120 | 120 | 120 | 120 | 120 | 120 | 120 | 120 | 120 | 120 |
| STABILITY, DAYS | >84 | >141 | >139 | >140 | >85 | >84 | >89 | 75** | >89 | >89 | >82 |

GEL STABILITY UNDER VARIOUS CONDITIONS USING $Na_2CR_2O_7/(NH_2)_2CS$ AS CROSSLINKER

| EXAMPLE | | | | |
|---|---|---|---|---|
| 80 | 81 | 82 | 83 | 84 |

TABLE 3-continued

| COMPOSITION | | | | | |
|---|---|---|---|---|---|
| 50/50 Na salt of 2-acrylamido-2-methylpropanesulfonic acid/Na Acrylate Viscosity, mPa.S | — | 3.5 | 3.8 | — | 3.8 |
| $Na_2Cr_2O_7$, ppm | 5535 | 3800 | 5000 | 5316 | 5500 |
| $(NH_2)_2CS$, ppm | 41515 | 11400 | 15000 | 31890 | 16500 |
| Milliequivalents $Cr^{3+}$/ Millimoles $NaCOO^-$ | 0.3125 | 0.33 | 0.33 | 0.35 | 0.36 |
| Gel Solids, % | 4.375 | 2.82 | 3.75 | 3.75 | 3.75 |
| Brine, TDS, ppm × $10^3$ | 77 | 55 | 55 | 55 | 1.1 |
| pH | 6.1 | 6.3 | 5.46 | 6.1 | 6.43 |
| PROPERTIES | | | | | |
| AGING TEMPERATURE, °C. | 120 | 120 | 120 | 120 | 120 |
| STABILITY, DAYS | >83 | 83* | >140 | >85 | >139 |

The data of Table 3 are also arranged in order of increasing chromium/carboxylate ratio. The data show performance patterns similar to Examples 13–31 wherein sodium thiosulfate was used. More particularly, using thiourea as the reducing agent, as before good results were obtained at 120° C. in harsh brine where the chromium/carboxylate ratio was above 2.0, preferably above 2.5, and gel solids content was above 3.0%, preferably above 3.5%. Again, with less harsh brines, good results were obtained with compositions outside the ranges recited above. It should be noted that differing number of days are reported in the stability data and this reflects the fact that the compositions were put on test on different days, hence some where heat aged for shorter periods than others as of the last evaluation data. In Table 3, a passing grade means that the samples were stable for the time indicated and are still on test. A failing grade means that the sample failed in the number of days indicated, and after failure the sample was taken off test. The data of Table 3 clearly indicate the long term high temperature gel stability of the profile modification compositions of the present invention at temperatures of about 120° C. in harsh environments.

EXAMPLES 85-98

In the following Examples, gellable compositions were prepared using aluminum citrate, 2:1 mol ratio, as the crosslinking agent and tested for high temperature gel stability in accordance with the procedures of Examples 13–84. The compositions prepared and the results obtained are set forth in Table 4, as follows:

TABLE 4

GEL PERFORMANCE UNDER VARYING CONDITIONS USING ALUMINUM CITRATE AS CROSSLINKER

| | EXAMPLE | | | | | | | | | | | | | |
|---|---|---|---|---|---|---|---|---|---|---|---|---|---|---|
| | 85 | 86 | 87 | 88 | 89 | 90 | 91 | 92 | 93 | 94 | 95 | 96 | 97 | 98 |
| COMPOSITION | | | | | | | | | | | | | | |
| 50/50 Na salt of 2-acrylamido-2-methylpropanesulfonic acid/Na Acrylate Viscosity, mPa.S | 3.8 | 3.0 | 3.0 | 3.0 | 3.0 | 3.0 | 3.8 | 3.8 | 4.8 | 4.8 | 4.8 | 4.8 | 3.0 | 3.0 |
| Aluminum Citrate 2:1 mol ratio | | | | | | | | | | | | | | |
| $Al^{3+}$, ppm | 1180 | 5800 | 2900 | 2900 | 4350 | 4350 | 5800 | 5800 | 5800 | 5800 | 5800 | 5800 | 8700 | 8700 |
| Gel Solids, % | 3.75 | 3.75 | 3.75 | 3.75 | 3.75 | 3.75 | 3.75 | 3.75 | 3.75 | 3.75 | 3.75 | 3.75 | 3.75 | 3.75 |
| Brine, TDS, ppm × $10^3$ | 1.1 | 1.1 | 55 | 55 | 55 | 55 | 55 | 55 | 55 | 55 | 55 | 55 | 55 | 55 |
| pH | 5.5 | 5.5 | 7.2 | 7.2 | 7.1 | 7.1 | 5.8 | 5.0 | 7.0 | 6.3 | 7.0 | 6.3 | 7.1 | 7.1 |
| PROPERTIES | | | | | | | | | | | | | | |
| AGING TEMPERATURE, °C. | 120 | 120 | 90 | 120 | 90 | 120 | 90 | 120 | 120 | 120 | 120 | 120 | 90 | 120 |
| STABILITY, DAYS | 13 No Gel | >131 | 34* | 3 No Gel | >130 | 13* | >144 | 21** | 54* | 20* | >114 | >114 | >130 | 34* |

As shown by the data of Table 4, aluminum citrate is an effective crosslinking agent for a 50/50 Na salt of 2-acrylamido-2-methylpropanesulfonic acid/Na Acrylate copolymer in harsh brine at 90° C. The data of Examples 85, 86, 88, 90, 92–94, and 98 show that gel performance at temperatures of 120° C. was poor and erratic at best. Examples 95 and 96 were prepared and tested in ampoules under a nitrogen atmosphere, in the substantial absence of oxygen. Under anerobic conditions, these gelable compositions employing aluminum citrate as the crosslinker, performed well at 120° C. in harsh brine.

EXAMPLES 99-116

The following examples were performed to evaluate the factors of crosslinker concentration and temperature on gelable compositions prepared with copolymers containing Na salt of 2-acrylamido-2-methylpropanesulfonic acid and Na acrylate monomers in differing molar ratios. The compositions were prepared and tested in accordance with the methods of examples 13–98. The results are set forth in Table 5, as follows:

TABLE 5

GEL PERFORMANCE FOR COMPOSITIONS COMPRISING DIFFERENT COPOLYMERS

EXAMPLE

TABLE 5-continued
GEL PERFORMANCE FOR COMPOSITIONS COMPRISING DIFFERENT COPOLYMERS

| | 99 | 100 | 101 | 102 | 103 | 104 | 105 | 106 | 107 |
|---|---|---|---|---|---|---|---|---|---|
| COMPOSITION | | | | | | | | | |
| Na salt of 2-acrylamido-2-methylpropanesulfonic acid/Na Acrylate, mol ratio | 100/0 | 85/15 | 30/70 | 30/70 | 30/70 | 15/85 | 15/85 | 15/85 | 85/15 |
| Aluminum Citrate, as $Al^{3+}$, ppm 2:1 mol ratio | 5800 | 5800 | 5800 | 5800 | 5800 | 5800 | 5800 | 5800 | — |
| $Na_2Cr_2O_7$, ppm | — | — | — | — | — | — | — | — | 500 |
| $(NH_2)_2CS$, ppm | — | — | — | — | — | — | — | — | 1500 |
| M.eq. $Cr^{3+}$/m.mol $NaCOO^-$ | — | — | — | — | — | — | — | — | 0.20 |
| Gel Solids, % | 3.75 | 3.75 | 3.75 | 3.75 | 3.75 | 3.75 | 3.75 | 3.75 | 3.75 |
| Brine TDS, ppm × $10^3$ | 55 | 55 | 55 | 55 | 55 | 55 | 55 | 55 | 55 |
| pH | 7.1 | 7.0 | 7.0 | 7.17 | 7.17 | 7.0 | 7.21 | 7.21 | 6.3 |
| PROPERTIES | | | | | | | | | |
| AGING TEMPERATURE, °C. | 90 | 90 | 90 | 90 | 120 | 90 | 90 | 120 | 120 |
| STABILITY, DAYS | 2 No Gel | 2 No Gel | >110 | >127 | 10* | 2 No Gel | >127 | 10* | 4 No Gel |

| | EXAMPLE | | | | | | | | |
|---|---|---|---|---|---|---|---|---|---|
| | 108 | 109 | 110 | 111 | 112 | 113 | 114 | 115 | 116 |
| COMPOSITION | | | | | | | | | |
| Na salt of 2-acrylamido-2-methylpropanesulfonic acid/Na Acrylate, mol ratio | 85/15 | 85/15 | 30/70 | 30/70 | 30/70 | 30/70 | 15/85 | 15/85 | 15/85 |
| Aluminum Citrate, as $Al^{3+}$, ppm 2:1 mol ratio | — | — | — | — | — | — | — | — | — |
| $Na_2Cr_2O_7$, ppm | 587 | 700 | 3800 | 5200 | 6400 | 7800 | 7400 | 9200 | 11000 |
| $(NH_2)_2CS$, ppm | 1761 | 2100 | 11400 | 15600 | 19200 | 23400 | 22200 | 27600 | 33000 |
| M.eq. $Cr^{3+}$/m.mol $NaCOO^-$ | 0.25 | 0.30 | 0.15 | 0.20 | 0.24 | 0.31 | 0.20 | 0.25 | 0.30 |
| Gel Solids, % | 3.75 | 3.75 | 3.75 | 3.75 | 3.75 | 3.75 | 3.75 | 3.75 | 3.75 |
| Brine TDS, ppm × $10^3$ | 55 | 55 | 55 | 55 | 55 | 55 | 55 | 55 | 55 |
| pH | 6.3 | 6.1 | 6.1 | 5.9 | 5.8 | 5.8 | 6.2 | 6.1 | 5.9 |
| PROPERTIES | | | | | | | | | |
| AGING TEMPERATURE, °C. | 120 | 120 | 120 | 120 | 120 | 120 | 120 | 120 | 120 |
| STABILITY, DAYS | 4 No Gel | 4 No Gel | 2 No Gel | 111* | 99* | 99** | 72* | 109* | >109 |

Examples 99–106 show the results obtained using aluminum citrate as the crosslinker for various sodium salt of 2-acrylamido-2-methylpropanesulfonic acid/sodium acrylate copolymers. These examples were run in the presence of oxygen which is clearly not the optimum condition for these compositions. Even under non-optimum conditions several results are expected and some are useful to predict the conditions which would be optimum or at least should provide improved results. For example, the 100% Na AMPS homopolymers, shown in Example 99, did not crosslink via aluminum citrate to form a gel, which was expected. Examples 103 and 106, showing poor results with aluminum citrate as crosslinker at 120° C. in the presence of oxygen was expected. At 90° C., however, as shown in Examples 101, 102, and 105 good results were obtained with aluminum citrate in the presence of oxygen. Examples 100 and 104 show poor results for the gel solids concentration tested even at 90° C. Turning now to the data obtained using sodium dichromate/thiourea as the crosslinking agent, shown in Examples 107–116, the 85/15 copolymers of Examples 107–109 all failed to gel indicating that the $Cr^{3+}/COO^-$ ratio of 0.30 or less is insufficient to effect crosslinking of these copolymers. See Table 1, Examples 1–4, wherein higher amounts of $Cr^{3+}$ provided gels stable at 120° C. for about 6 months. The 30/70 copolymer data set forth in Examples 110–113, confirm the data provided in Examples 8–12 of Table 1, namely that for these 30/70 copolymers a $Cr^{3+}/COO^-$ ratio of 0.20 is insufficient to provide high temperature stable gels, but a ratio above 0.24 appears to be too much crosslinker in harsh brines because it led to syneresis of the gel. The 15/85 copolymer data shown in Examples 114–116 suggests that a $Cr^{3+}/COO^-$ ratio of 3.0 or higher is effective to provide a high temperature stable gel at 3.75% solids in harsh brine.

It should be understood that the foregoing Examples have been provided to illustrate the kinds of preliminary tests that may be performed to determine the optimum composition of copolymer and crosslinker, for use as a profile modification agent in a given reservoir setting, presenting certain conditions of temperature, salinity, pH and oxygen content.

EXAMPLE 117

The following Example demonstrates profile modification of a simulated subterranean formation in the form of a sand-packed column or "core".

A gelable composition with the scope of the present invention was prepared by forming a solution of a 50/50 Na salt of 2-acrylamido-2-methylpropanesulfonic acid/Na Acrylate copolymer in synthetic seawater (a standard brine, 30,600 ppm TDS) to provide a solution containing 3.75% gel solids. Thereafter, 3600 ppm of sodium dichromate and 10,800 ppm of thiourea were added with thorough mixing. An aliquot portion of the gelable composition was placed in a glass ampoule, as in Examples 1–116.

A six-inch sand-packed column was prepared and flushed with seawater until completely wetted. The initial permeability of the column was $K_{br}=45$ Darcy.

The gelable composition was slowly introduced to the column to saturate the sand-pack, and addition continued until at least 50 mls of gelable composition had been collected from the bottom of the column.

Thereafter, both the saturated column and the ampoule samples were placed in an oven at 113° C. (235° F.). The aliquot sample gelled in about 3½ to 4 hours. Both the column and Samples were heat-aged at this temperature for 37 days.

After 37 days, the ampoule sample was still a rigid gel.

The aged treated sand-pack was then subjected to a pressurized pipe test, by forcing synthetic seawater against the sand-pack with a Milton Roy mini pump. The face pressure of the gelled column increased to 500 psi before a breakthrough was observed.

The foregoing example demonstrates the effectiveness of the compositions of the present invention in reducing the permeability of, i.e. altering the fluid flow profile, of an underground formation characterized by elevated reservoir temperatures above 100° C.

The new and improved compositions and methods of the present invention now permit effective profile modification of subterranean hydrocarbon-bearing formations to be performed in high temperature and/or harsh brine reservoirs which heretofore were unsuited for treatments in accordance with prior art methods employing prior art materials.

Although the present invention has been described with reference to certain preferred embodiments, modifications or changes may be made therein by those skilled in this art. For example, as has been mentioned above, instead of a copolymer comprising sodium 2-acrylamido-2-methyl propanesulfonate and sodium acrylate, other copolymers of sodium or potassium 2-acrylamidopropanesulfonate and sodium or potassium acrylate or methacrylate; or of sodium or potassium 2-acrylamido-2-phenylpropanesulfonate and sodium or potassium acrylate or methacrylate, or acrylic acid or methacrylic acid, or hydroxyethyl acrylate or methacrylate, or corresponding copolymers of any of the foregoing may be used as the copolymer component (b). Instead of $Cr^{3+}$ being used as the oxidizing or crosslinking agent other polyvalent metal ions or ion containing compounds may be used such as $Fe^{2+}$, $Fe^{3+}$, $Ti^{4+}$, $Zn^{2+}$, $Sn^{4+}$, $Mg^{2+}$, $Ce^{4+}$, potassium permangamate, sodium permangamate, ammonium chromate, alkali metal chromates, ammonium or potassium dichromate, chromium trioxide, to name but a few. Instead of sodium thiosulfate and thiourea being used as the reducing agent, other reducing agents such as sodium sulfide, sodium hydrosulfite, sodium metabisulfite, potassium sulfite, sodium sulfite, ferrous sulfate, ferrous chloride, or complexing agents such as acetate, nitrilotriacetate, tartrate, citrate, tripolyphosphate, metaphosphate, orthophosphate and the like may be used. All such obvious modifications may be made herein, without departing from the scope and spirit of the present invention as defined in the appended claims.

What is claimed is:

1. In a method for altering the permeability of at least a portion of a subterranean formation penetrated by at least one wellbore comprising the steps of passing a fluid gelable composition into the formation to a preselected location and gelling the composition to modify the fluid flow profile of said portion of the formation, the improvement comprising using as the fluid gellable composition, a composition comprising:
    (a) water;
    (b) a water-thickening and cross-linkable amount of a water-dispersible polymer consisting essentially of:
        (i) from about 30 to about 99 mol % of 2-acrylamido-2-methylpropanesulfonic acid units or salts thereof and
        (ii) from about 70 to 1 mol % of acrylic acid units or salts thereof an
    (c) an amount of a polyvalent metal capable of cross-linking said polymer to form a stable gel, wherein said polyvalent metal in component (c) is provided in the form of a redox couple, said redox couple comprising (iii) at least one oxidizing agent comprising a water-soluble compound of said polyvalent metal in its highest valence state and being capable of being reduced to a lower valence state and being selected from the group consisting of hexavalent chromium compounds and permanganates and (iv) a reducing agent effective to reduce the higher valence metal in oxidizing agent (iii) to a lower polyvalent valence state.

2. A process according to claim 1 wherein said polymer has a molecular weight of at least about 100,000.

3. A process according to claim 2 wherein said polymer has a molecular weight of from about 100,000 to about 15,000,000.

4. A process according to claim 1 wherein the oxidizing agent (c) (iii) is selected from the group consisting of potassium permanganate, sodium permanganate, ammonium chromate, ammonium dichromate, alkali metal chromates, alkali metal dichromates and chromium trioxide.

5. A process according to claim 1 or claim 4 wherein said reducing agent (c) (iv) is selected from the group consisting of alkali metal sulfites, alkali metal hydrosulfites, alkali metal metabisulfites, alkali metal sulfides, alkali metal thiosulfates, ferrous sulfate, thioacetamide, thiourea, hydroquinone, ferrous chloride, p-hydrazinobenzoic acid, hydrozine phosphite and hydrazine dichloride.

6. A process according to claim 1 wherein said redox couple comprises (III) sodium dichromate and (iv) sodium thiosulfate or thiourea.

7. A method as recited in claim 1 wherein said gelable composition comprises:
    (a) water;
    (b) from about 2.0% to about 5% by weight of said composition of a 50/50 sodium 2-acrylamido-2-methylpropanesulfonate/sodium acrylate copolymer, said copolymer having a molecular weight, $M_w$, of between about 100,000 and 15,000,000;
    (c) an amount of sodium dichromate sufficient to provide a m.eq. $Cr^{3+}$/m.moles COO ratio of between about 0.25 to about 0.35 upon contact with a reducing agent; and
    (d) an amount of a reducing agent selected from sodium thiosulfate or thiourea sufficient to cause liberation of $Cr^{3+}$ ions from the sodium dichromate.

* * * * *